United States Patent [19]

Wattron

[11] Patent Number: 5,522,208
[45] Date of Patent: Jun. 4, 1996

[54] FARM MACHINE AND CONNECTING AND TRANSMISSION DEVICE THEREFOR

[75] Inventor: Bernard Wattron, Haegen, France

[73] Assignee: Kuhn S.A., Saverne Cedex, France

[21] Appl. No.: 346,937

[22] Filed: Nov. 23, 1994

[30] Foreign Application Priority Data

Nov. 23, 1993 [FR] France ................... 93 14216

[51] Int. Cl.$^6$ ................................. A01D 34/00
[52] U.S. Cl. ............. 56/15.1; 56/15.7; 56/DIG. 14; 280/492
[58] Field of Search .............. 56/15.2, 15.1, 56/15.7, 15.9, 12.6, DIG. 14, DIG. 6; 280/492

[56] References Cited

U.S. PATENT DOCUMENTS

| | | |
|---|---|---|
| 2,421,044 | 5/1947 | Vutz . |
| 4,525,987 | 7/1985 | Werner et al. ............... 56/15.2 |
| 5,186,271 | 2/1993 | McLean . |
| 5,386,680 | 2/1995 | Friesen ...................... 56/15.7 |
| 5,417,042 | 5/1995 | Walch et al. ................ 56/15.2 |
| 5,423,165 | 6/1995 | Walch et al. ................ 56/15.2 |

FOREIGN PATENT DOCUMENTS

| | | |
|---|---|---|
| 0027295 | 4/1981 | European Pat. Off. . |
| 0124462 | 11/1984 | European Pat. Off. . |
| 0196263 | 10/1986 | European Pat. Off. . |
| 0269901 | 6/1988 | European Pat. Off. . |
| 0316899 | 5/1989 | European Pat. Off. . |
| 0429382 | 5/1991 | European Pat. Off. . |
| 0434915 | 7/1991 | European Pat. Off. . |
| 0512326 | 11/1992 | European Pat. Off. . |
| 2171884 | 9/1986 | United Kingdom . |

*Primary Examiner*—Terry Lee Melius
*Assistant Examiner*—Heather Chun Shackelford
*Attorney, Agent, or Firm*—Oblon, Spivak, McClelland, Maier & Neutstadt

[57] ABSTRACT

A farm machine, and a connecting and transmission device for a farm machine are provided in which the farm machine possesses various degrees of freedom with respect to a tractor vehicle. The connecting assembly includes a tow-bar having a primary tow-bar connected to two lower bars of a tractor hitching device, and a secondary tow-bar connected to a body which is equipped with work elements. A connecting and transmission device links the primary tow-bar to the secondary tow-bar. The assembly and connecting arrangements of the assembly provide a great range of mobility with respect to an axis extending approximately in the direction of advance, with the connecting and transmission device improved from a standpoint of the transmission of forces, with the primary tow-bar connected to the front and to the back of the connecting and transmission device.

27 Claims, 4 Drawing Sheets

FARM MACHINE AND CONNECTING AND TRANSMISSION DEVICE THEREFOR

BACKGROUND OF THE INVENTION

1. Field of the Invention

The invention relates to a farm machine having a body equipped with work elements, and a tow-bar comprising a primary tow-bar designed to be connected to a tractor vehicle, a secondary tow-bar connected to the body of the machine and a connecting and transmission device linking the primary tow-bar to the secondary tow-bar and by which the work elements are driven from the power take-off of the tractor vehicle.

2. Discussion of the Background

Farm machines, in the form of a mower-conditioner having a primary tow-bar, a secondary tow-bar and a connecting and transmission device as mentioned above, are known, as disclosed in EP 0 027 295 A1. The primary tow-bar of this known farm machine is formed by a curved member and is designed to be connected to the two lower bars of the hitching device of a tractor vehicle to which the farm machine must be hitched. The primary tow-bar can thus pivot around a first axis formed by the two connecting points to the lower bars. This first axis extends, in a normal displacement position, at least approximately horizontally and at least approximately at a right angle to the direction of advance.

The connecting and transmission device comprises two parts that can pivot in relation to one another around a second axis directed upwardly (in the normal displacement position, this second axis extends at least approximately vertically). In this known farm machine, the primary part of the connecting and transmission device consists of a primary angle transmission housing that includes a barrel directed upwardly and guided for rotation in a hub welded to the front end of the secondary tow-bar, which constitutes the secondary part of the connecting and transmission device. The merged longitudinal axes of the barrel and the hub define the second axis. The primary angle transmission housing supports an input shaft whose axis of rotation extends in the direction of advance, as well as an output shaft guided in rotation in the barrel and whose axis of rotation is merged with the second axis. Inside the primary angle transmission housing, these two shafts are coupled by means of a pair of bevel gears. Outside the primary angle transmission housing, the input shaft is coupled to a telescopic shaft with universal joints by which it is drivingly connected to the power take-off of the tractor vehicle. The output shaft is equipped at its upper end with a pulley transmitting the movement to the work elements by means of belts.

In another embodiment described in document EP 0 027 295 A1, the secondary part of the connecting and transmission device also consists of an angle transmission housing. This secondary angle transmission housing exhibits a hub directed downwardly, in which the barrel of the primary angle transmission housing is guided in rotation. The output shaft of the primary angle transmission housing enters inside the secondary angle transmission housing and is coupled there by means of a pair of bevel gears to the output shaft of said secondary angle transmission housing. The latter output shaft transmits the movement to the work elements.

The primary tow-bar is connected to the primary part of the connecting and transmission device by a pivot connection provided at the middle part of the curved member, with an axis directed at least approximately in the direction of advance. In fact, the curved member is mounted on the input shaft of the primary angle transmission housing so as to be able to pivot around the axis of rotation of the input shaft.

While in the embodiment described in EP 0 027 295 A1, the curved member forming the primary tow-bar is mounted directly on the input shaft of the primary angle transmission housing, an embodiment has also been marketed in which the curved member is mounted on a pivot pin attached to the primary angle transmission housing and which extends parallel to the input shaft and underneath the latter. The curved member is thus also able to pivot around an axis directed at least approximately in the direction of advance.

As a result of the three axes discussed above, the farm machine can perfectly adapt to the contour of the ground independent of the position of the tractor vehicle to which it is hitched, and will enjoy great maneuverability both during work and in transport. Moreover, during work, this great independence of the farm machine in relation to the tractor vehicle does not have an effect on the various elements designed to transmit the movement to the work elements. However, in these various known embodiments, the curved member forming the primary tow-bar is mounted in an overhanging manner on the primary angle transmission housing and more generally on the connecting and transmission device. This is detrimental to the life of the connecting and transmission device, the danger furthermore increasing with the increase in the work widths and in correspondence with the weight of the farm machines.

SUMMARY OF THE INVENTION

It is an object of the invention to eliminate the aforementioned drawbacks.

For this purpose, the farm machine of the invention, which has a body equipped with work elements, and a tow-bar comprising a primary tow-bar designed to be connected to the two lower bars of the hitching device of a tractor vehicle, so as to be able to pivot around a first axis formed by the two connecting points to the lower bars, a secondary tow-bar connected to the body and a connecting and transmission device linking the primary tow-bar to the secondary tow-bar and by which the work elements are driven from the power take-off of the tractor vehicle, (i) with the connecting and transmission device having two parts that can pivot in relation to one another around a second axis that is at least approximately vertical, (ii) with the primary tow-bar, with respect to the direction of advance, connected to the front of a primary part of said two parts by means of a first connection with an axis directed at least approximately in the direction of advance, and (iii) with the secondary tow-bar connected to a secondary part of said two parts, is characterized by the fact that the primary tow-bar is, with respect to the direction of advance, also connected to the back of the primary part by means of a second connection with an axis merged with the axis of the first connection.

As a result of the arrangement of the present invention, the primary tow-bar retains a great range of mobility around the third axis directed at least approximately in the direction of advance, while the connection between the primary tow-bar and the connecting and transmission device has clearly been improved from the standpoint of the transmission of the forces, since the primary tow-bar is connected at the same time to the front and to the back of the connecting and transmission device.

In accordance with an additional aspect of the invention, the third axis can be arranged to intersect the second axis.

According to a further aspect of the invention, at least the second connection can be a pivot-type connection. In this case, the tractive force, applied by the tractor vehicle on the primary tow-bar, will be transmitted to the connecting and transmission device by the back.

According to another aspect of the invention, the secondary part of the connecting and transmission device can have a barrel centered on the second axis and guided for rotation in a hub of the primary part of the connecting and transmission device, with the primary tow-bar being connected to the hub by the first and second connections. Advantageously, the hub will be guided on the barrel by two bearings apart from one another. Preferably, these bearings will consist of roller bearings. Also preferably, the first and second connections will extend, in this case, at least approximately halfway between these two bearings. The forces on the bearings will thus be more balanced.

According to yet another aspect of the invention, the first and second connections can each have a pivot pin provided on the primary part of the connecting and transmission device, and a sleeve provided on the primary tow-bar. Further, when the primary part has a cast housing and/or a cast hub, the pivot pins will also be directly obtained by casting.

According to a further aspect of the invention, the primary tow-bar can have a curved member having two legs and a middle part, with the curved member hinged on the primary part of the connecting and transmission device at the middle part, while the free end of each leg is designed to be connected to the corresponding lower bar of the hitching device of the tractor vehicle. According to a still further aspect of the invention, the primary tow-bar can, in addition, comprise a crosspiece connecting the two legs of the curved member to one another. In this case, the crosspiece will advantageously be connected to the primary part of the connecting and transmission device by means of one of the first and second connections, the curved member then being connected to the primary part by means of the other of the connections. Also in this case, the middle part of the curved member can extend, with respect to the direction of advance, behind the primary part of the connecting and transmission device and be connected there by means of the second connection, while the crosspiece will be installed in front of the primary part, and will be connected there by means of the first connection. The tractive force exerted by the tractor vehicle on the primary tow-bar will thus be directly transmitted by the curved member to the connecting and transmission device.

According to yet another aspect of the invention, the crosspiece can extend in a plane which is at least approximately vertical, and at least approximately parallel to the first axis.

In a further aspect of the invention, the crosspiece can be connected in a removable way to the two legs of the curved member. In this case, the connection between the crosspiece and the curved member will advantageously have means for compensating for the manufacturing tolerances. Preferably, these means for compensating for the manufacturing tolerances will include an elastic bushing at the level of the connection of each end of the crosspiece to the corresponding leg of the curved member. Furthermore, the axis of each of these elastic bushings will, preferably, be at least approximately parallel to the third axis.

The invention also relates to a connecting and transmission device as described above.

BRIEF DESCRIPTION OF THE DRAWINGS

Other characteristics and advantages of the invention will become apparent from the following description of a non-limiting exemplary embodiment of the invention, particularly with reference to the accompanying drawing in which.

DETAILED DESCRIPTION OF THE PREFERRED EMBODIMENT

Figure 1:
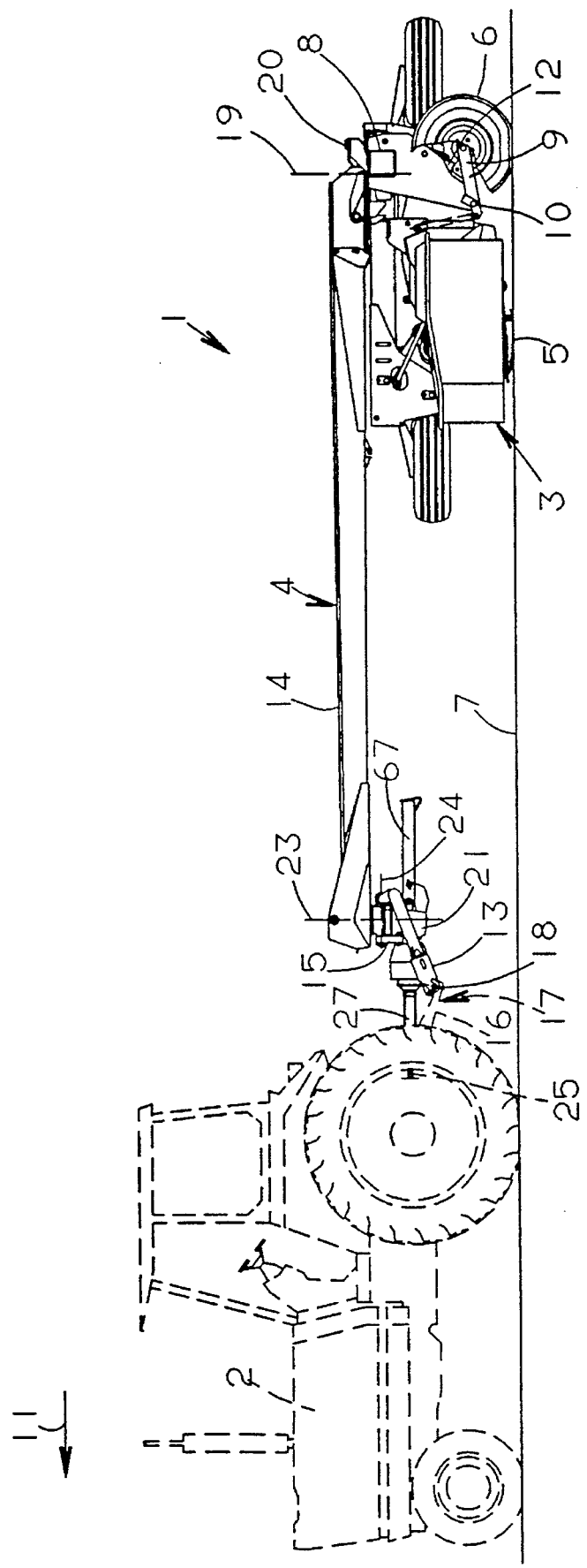
FIG. 1 is a side view of a farm machine according to the invention hitched to a tractor vehicle.

Referring now to the drawings in which like reference numerals designate identical or corresponding parts throughout the several views, in FIG. 1, a farm machine (1) hitched to a tractor vehicle (2) is represented. This farm machine (1) includes a body (3) and a tow-bar (4) which makes possible its connection to the tractor vehicle (2).

The body (3) of this farm machine (1) is equipped with work elements (5) and wheels (6) by which the body (3) rests on the ground (7). Each wheel (6) is connected to a frame (8) of the body (3) by a corresponding wheel arm (9), so as to be able to pivot around a horizontal axis (10) directed crosswise to the direction of advance (11). The pivoting of the wheel arm (9) around axis (10) is performed by a corresponding hydraulic cylinder (12).

Tow-bar (4) includes a primary tow-bar (13), a secondary tow-bar (14) and a connecting and transmission device (15). The primary tow-bar (13) is designed to be connected to the two lower bars (16) of the hitching device (17) of the tractor vehicle (2). Primary tow-bar (13) can thus pivot around a first axis (18) indicated by the two connecting points to the lower bars (16). This first pivot axis (18) extends, in normal displacement position, at least approximately horizontally and at least approximately at a right angle to the direction of advance (11).

The secondary tow-bar (14) is connected to the body (3) so as to be able to be pivot around an axis (19) directed upwardly, preferably under the action of a hydraulic cylinder (20). In the normal displacement position, this axis (19) is at least approximately vertical. Tow-bar (4) can thus occupy a transport position and at least one work position in relation to the body (3).

The connecting and transmission device (15) includes two parts (21, 22) which can pivot in relation to one another around a second axis (23) directed upwardly (in the normal displacement position, this second axis (23) extends at least approximately vertically). A secondary part (22) is attached to the secondary tow-bar (14). Primary tow-bar (13) is hinged on a primary part (21), so as to be able to pivot around a third axis (24) directed at least approximately in the direction of advance (11).

The driving of work elements (5) is performed by the power take-off shaft (25) of the tractor vehicle (2). This shaft (25) is coupled to an input shaft (26) (whose axis of rotation is directed at least approximately in the direction of advance (11)) of the primary part (21) by a telescopic drive shaft having universal joints (27). The movement is transmitted inside of the connecting and transmission device (15) from the input shaft (26) of the primary part (21) to an output shaft (28) of the secondary part (22) by a mechanism known to a person skilled in the art and which will be succinctly described later. Output shaft (28) is coupled, by a universal joint (29), to a drive shaft (30) housed inside the secondary tow-bar (14). The continuation of the transmission of the movement will not be described in further detail since it is known to those skilled in the art (see by way of a nonlimiting example the document EP 0 429 382 A1 to which reference can be made if needed).

As an advantageous result of this tow-bar (4), the farm machine (1) possesses various degrees of freedom in relation to tractor vehicle (2) with respect to:

rotation around the first axis (18) so that the farm machine (1) can be displaced in relation to the tractor vehicle (2) in a plane at least approximately vertical;

rotation around the second axis (23) so that the farm machine (1) can be displaced in relation to the tractor vehicle (2) in a plane at least approximately horizontal (negotiation of turns); and rotation around the third axis (24).

The first and third rotations make it possible for the farm machine (1) to adapt perfectly to the contour of ground (7) independently of the tractor vehicle (2). Thus any danger of deformation of the tow-bar (4) and/or of overturning of the tractor vehicle (2) is eliminated.

The second rotation makes it possible to negotiate turns of a very great amplitude without dangers to the telescopic drive shaft with universal joints (27).

The connecting and transmission device is represented in greater detail in FIGS. 2 to 5. Primary part (21) includes a housing (33) exhibiting a hub (34) directed toward the secondary part (22). The latter comprises a housing (35) exhibiting a barrel (36) directed toward the primary part (21). Barrel (36) is centered on the second axis (23) and extends inside the hub (34), which is guided in rotation there by roll bearings (37, 38) spaced apart from one another.

Inside of the housing (33), input shaft (26) is coupled to an intermediate shaft (39) by means of a pair of bevel gears (40, 41). This intermediate shaft (39) is guided in rotation in barrel (36, FIG. 4) by two roller bearings (42), and its axis of rotation is merged with the second axis (23). Inside of the housing (35), the intermediate shaft (39) is coupled to the output shaft (28) by means of a pair of bevel gears (43, 44).

Secondary part (22), more specifically housing (35) of the secondary part, is connected to secondary tow-bar (14) in a way which is known to those skilled in the art and which is clearly explained in the document EP 0 196 263 A1 to which reference can be made if needed. However, it is understood that alternate connections could also be utilized.

Figure 2:
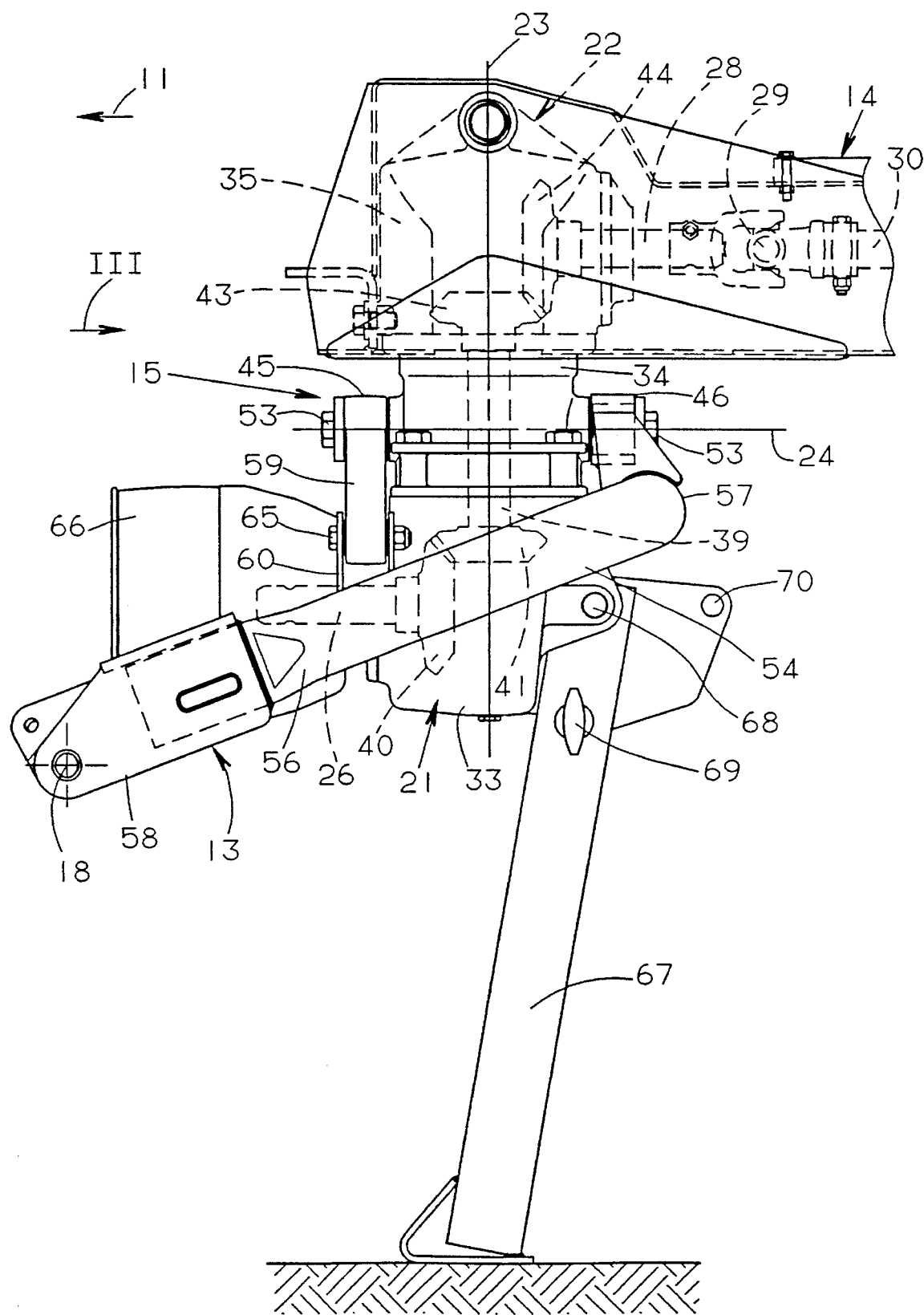
FIG. 2 is a side view of the front part of the tow-bar of the farm machine of FIG. 1, however with the farm machine unhitched from the tractor vehicle.
Figure 3:
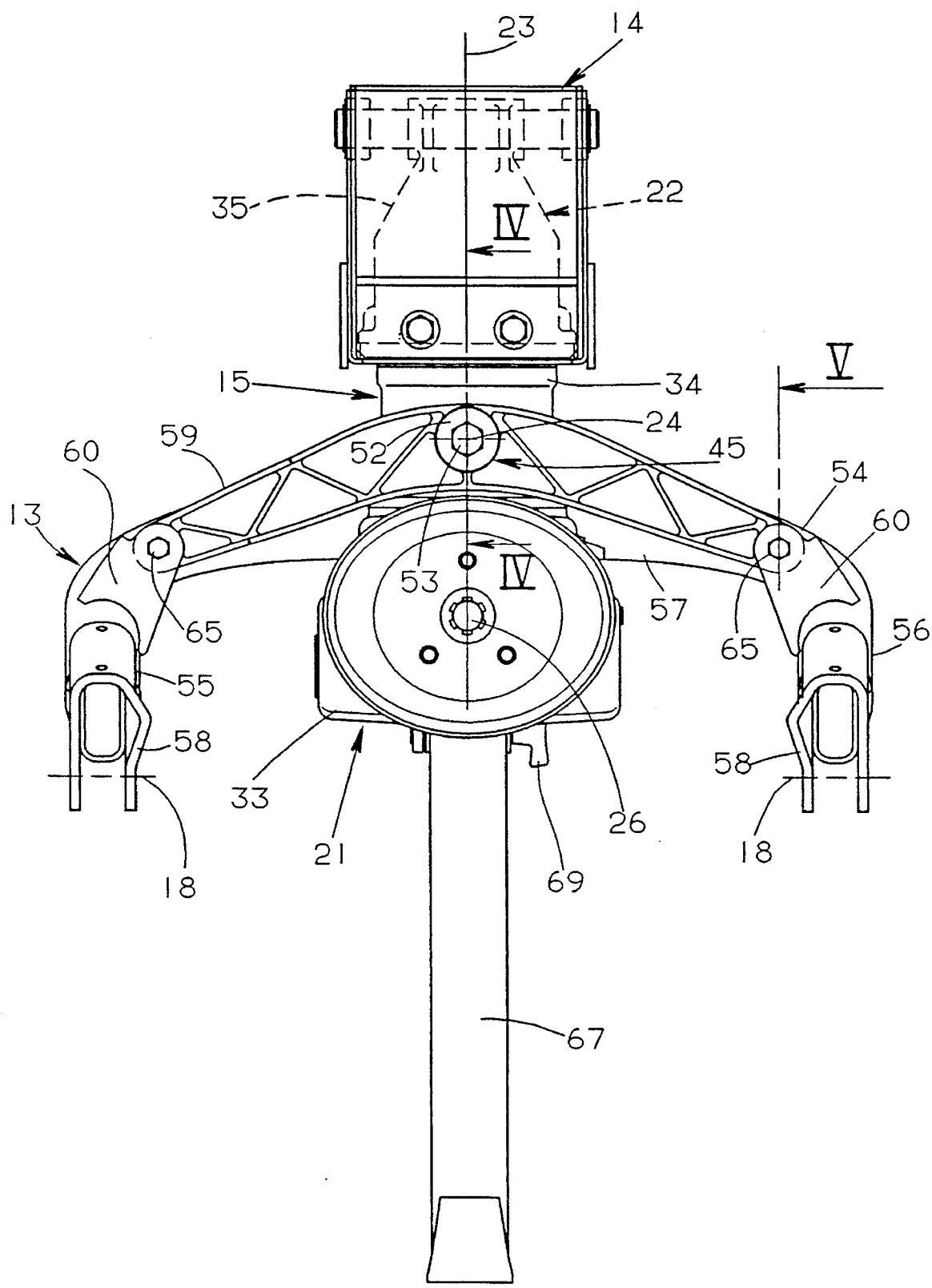
FIG. 3 represents a view along arrow III (FIG. 2) of the front part of the tow-bar, with the farm machine unhitched from the tractor vehicle.
Figure 4:
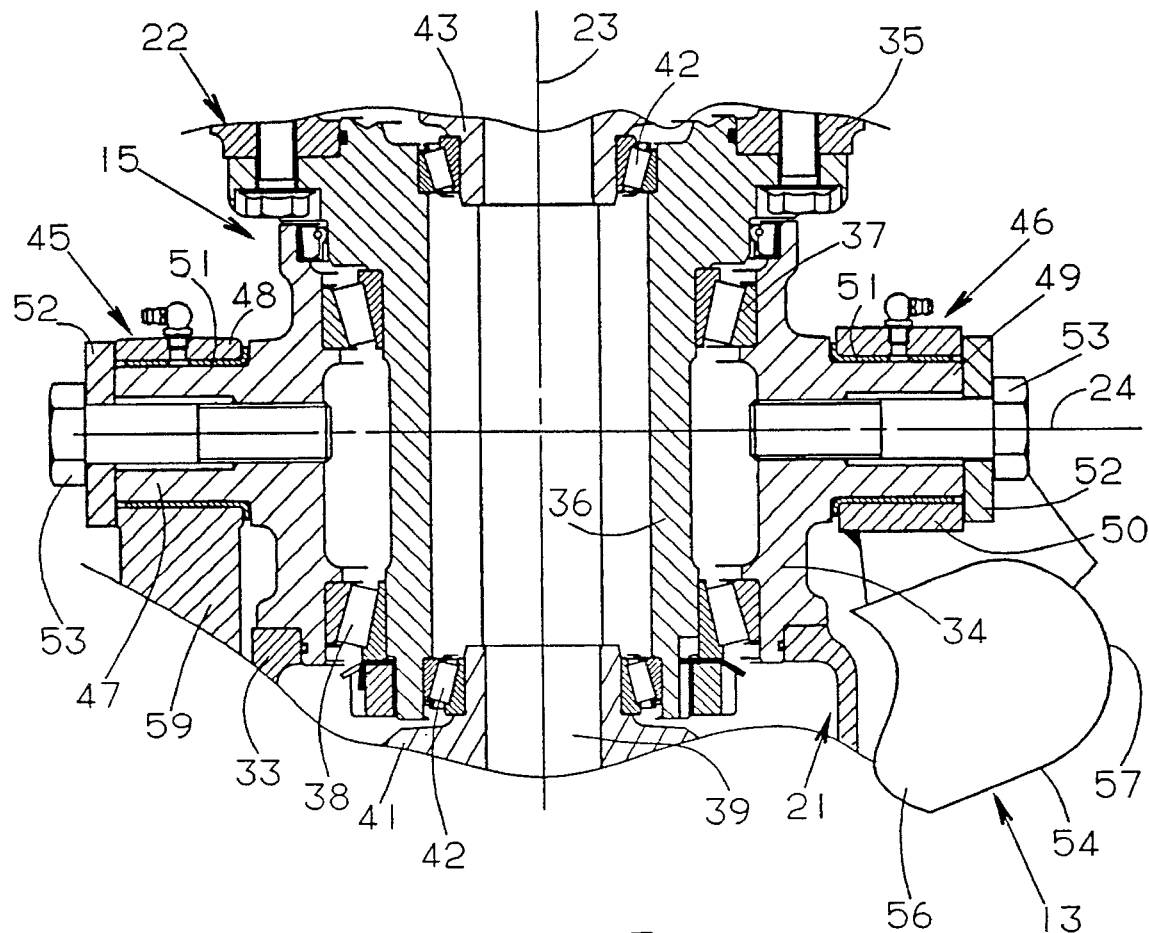
FIG. 4 represents a view, on an enlarged scale, of the connection of the primary tow-bar to the connecting and transmission device, with the connection cut along plane IV (FIG. 3)
Figure 5:
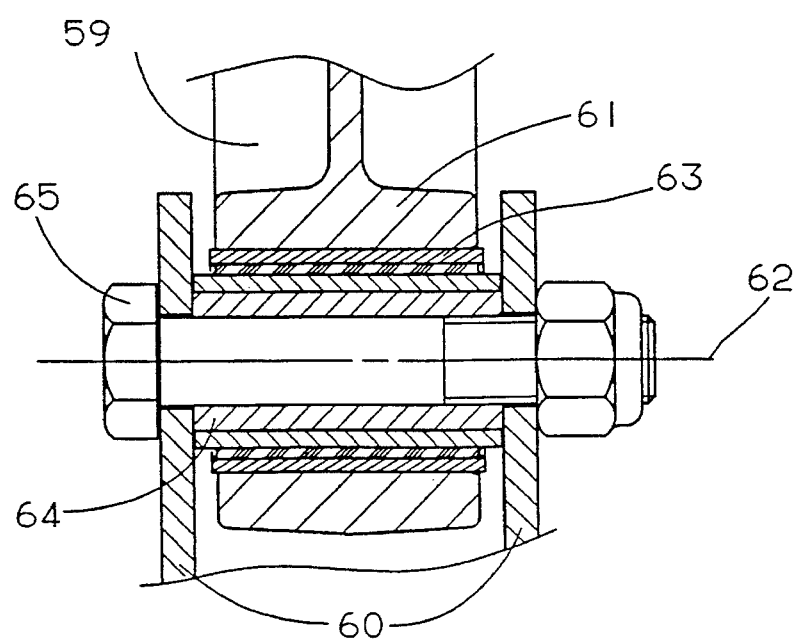
FIG. 5 represents a view, on an enlarged scale, of the connection of the crosspiece to one of the legs of the curved member, with the connection cut along plane V (FIG. 3).

Primary tow-bar (13) is, with respect to the direction of advance (11), connected to the front of the primary part (21) by means of a first connection (45), and, to the back by means of a second connection (46). The axis of the first connection (45) and the axis of the second connection (46) are merged and constitute the third axis (24). As shown in FIGS. 2 to 4, this third axis (24) intersects the second axis (23) at right angles. As further shown in FIG. 4, the first connection (45) and second connection (46) extend at least approximately halfway between the two roller bearings (37, 38) guiding hub (34) on the barrel (36).

The first connection (45) includes a pivot pin (47) integral with the hub (34) and a sleeve (48) integral with the primary tow-bar (13). The second connection (46) also includes a pivot pin (49) integral with the hub (34) and a sleeve (50) integral with the primary tow-bar (13). As can be seen, the hub (34) is made by casting and pivot pins (47, 49) are directly obtained or formed during the casting. Each sleeve (48, 50) is mounted on the corresponding pivot pin (47, 49) after insertion of a ring (51). A washer (52), held by a bolt (53) stops any translation of the corresponding sleeve (48, 50), so that the first connection (45) and the second connection (46) are pivot-type connections. However, in the invention, only one of these connections (45, 46) may be of the pivot-type. In this case, it will preferably be the second connection (46) which will be of the pivot-type.

The primary tow-bar (13) comprises a curved member (54) having, in plan view, the shape of a U, i.e., having two legs (55, 56) and a middle part (57). At its free end, each leg (55, 56) is provided with a hitching yoke (58) designed to be coupled to the corresponding lower bar (16) of the hitching device (17) of the tractor vehicle (2). Furthermore, as shown, the two legs (55, 56) are at least approximately parallel to one another and each extends at least approximately in a vertical plane parallel to the direction of advance (11). In side view, it is seen that the two legs (55, 56) are, in addition, inclined forwardly and downwardly. The middle part (57) extends, in a normal position, horizontally and crosswise to the direction of advance (11). Moreover, with respect to the direction of advance (11), the middle part (57) is behind the primary part (21) and supports the sleeve (50) of second connection (46).

Primary tow-bar (13) additionally includes a crosspiece (59) which extends, with respect to the direction of advance (11), in front of the primary part (21) and supports the sleeve (48) of the first connection (45). Crosspiece (59) also extends in a plane which is at least approximately vertical, and at least approximately parallel to the second axis (18). Moreover, the crosspiece (59) connects the two legs (55, 56) to one another, which each include a yoke (60) for this purpose. Crosspiece (59) has at each of its free ends a sleeve (61) whose axis (62) is at least approximately parallel to the third axis (24), with the sleeve (61) designed to extend inside the corresponding yoke (60). For this purpose, the width of the sleeve (61) is somewhat lesser than the inside width of the yoke (60). An elastic bushing (63) is introduced into the sleeve (61), while on the inside of the elastic bushing (63) a ring (64) is mounted, whose length is approximately equal to the inside width of the yoke (60). A bolt (65) is finally introduced through the yoke (60) and ring (64). The two elastic bushings (63) make it possible to compensate for manufacturing tolerances.

In FIG. 2, finally it is further seen that a protective bowl (66) surrounds the input shaft (26), and that a stand (67), mounted on the housing (33) of the primary part (21), supports the front part of the tow-bar (4) when the farm machine (1) is unhitched from the tractor vehicle (2). When the farm machine (1) is hitched to the tractor vehicle (2), the stand (67) is held in the raised position after pivoting around axis (68) and introduction of the pin (69) in the hole (70).

Various modifications can be made to the exemplary embodiment which has just been described without departing from the general scope of this invention as defined in the following claims. For example, the first connection (45) and second connection (46) could be installed so that the third axis (24) which they define, does not intersect the second axis (23), but is sufficiently offset laterally in relation to it so that the pivot pins (47, 49) can quite simply be replaced with a single pin common to both connections (45, 46). In addition, pivot pins (47, 49) are directly cast in the mass of the hub (34), but could also be added and attached solidly to the hub (34).

Furthermore, the pivot pins (47, 49) could also be installed elsewhere besides on the hub (34), for example on the housing (33). The pivot pins (47, 49) could also be integral with the primary tow-bar (13), while sleeves (48, 50) could be provided on the hub (34) or the housing (33).

What is claimed as new and desired to be secured by Letters Patent of the United States is:

1. A farm machine comprising:
   (a) a body equipped with work elements, and
   (b) a tow-bar comprising:
      (i) a primary tow-bar designed to be connected to two lower bars of a hitching device of a tractor vehicle, so as to be able to pivot around a first axis formed by two connecting points to said two lower bars,
      (ii) a secondary tow-bar connected to said body, and
      (iii) a connecting and transmission device linking said primary tow-bar to said secondary tow-bar and by which said work elements are driven from a power take-off of said tractor vehicle, said connecting and transmission device comprising two parts which can pivot in relation to one another around a second axis which is approximately vertical, said primary tow-bar being, with respect to a direction of advance, connected to a front of a primary part of said two parts by means of a first connection with a third axis directed approximately in the direction of advance, and said secondary tow-bar being connected to a secondary part of said two parts;
   wherein said primary tow-bar is, with respect to the direction of advance, also connected to a back of said primary part by means of a second connection with a fourth axis merged with said third axis of said first connection.

2. The farm machine according to claim 1, wherein the third axis intersects the second axis.

3. The farm machine according to claim 1, wherein at least the second connection is a pivot-type connection.

4. The farm machine according to claim 1, wherein said secondary part comprises a barrel centered on the second axis and guided for rotation in a hub of said primary part, said primary tow-bar being connected to said hub by said first connection and said second connection.

5. The farm machine according to claim 4, wherein said hub is guided on said barrel by means of two bearings spaced apart from one another.

6. The farm machine according to claim 5, wherein said bearings consist of roller bearings.

7. The farm machine according to claim 5, wherein said first connection and said second connection extend approximately halfway between said two bearings.

8. The farm machine according to claim 1, wherein said first connection and said second connection each comprise a pivot pin provided on said primary part, and a sleeve provided on said primary tow-bar.

9. The farm machine according to claim 8, wherein said primary part comprises a housing and/or a hub which is formed by casting, and each pivot pin is also formed by casting.

10. The farm machine according to claim 1, wherein said primary tow-bar comprises a curved member having two legs and a middle part, said curved member being hinged on said primary part at said middle part, while a free end of each leg is arranged to be connected to the corresponding lower bar of the hitching device of the tractor vehicle.

11. The farm machine according to claim 10, wherein said primary tow-bar additionally comprises a crosspiece connecting said two legs of said curved member to one another.

12. The farm machine according to claim 11, wherein said crosspiece is connected to said primary part by means of one of said first and second connections, the curved member then being connected to said primary part by means of the other of the connections.

13. The farm machine according to claim 11, wherein said middle part of said curved member extends, with respect to the direction of advance, behind said primary part and is connected there by means of said second connection, and said crosspiece is installed in front of said primary part and is connected there by means of said first connection.

14. The farm machine according to claim 11, wherein said crosspiece extends in a plane approximately vertical and approximately parallel to the first axis.

15. The farm machine according to claim 11, wherein said crosspiece is removably connected to the two legs of said curved member.

16. The farm machine according to claim 15, wherein the connection between said crosspiece and said curved member comprises means for compensating for manufacturing tolerances.

17. The farm machine according to claim 16, wherein said means for compensating for the manufacturing tolerances comprise an elastic bushing at the connection of each end of said crosspiece to the corresponding leg of said curved member.

18. The farm machine according to claim 17, wherein an axis of each elastic bushing is approximately parallel to the third axis.

19. A connecting and transmission device for a farm machine comprising:
   (a) a body equipped with work elements, and
   (b) a tow-bar comprising:
      (i) a primary tow-bar designed to be connected to two lower bars of a hitching device of a tractor vehicle, so as to be able to pivot around a first axis formed by two connecting points to said two lower bars, and
      (ii) a secondary tow-bar connected to said body,
   said connecting and transmission device, which is designed to connect said primary tow-bar to said secondary tow-bar, and by which said work elements have to be driven from a power take-off of said tractor vehicle, said connecting and transmission device comprising two parts which can pivot in relation to one another around a second axis which is approximately vertical, said primary tow-bar being, with respect to a direction of advance, designed to be connected to a front of a primary part of said two parts by means of a first connection with a third axis directed approximately in the direction of advance, and to a back of the primary part by means of a second connection with a fourth axis merged with said third axis of said first connection, and said secondary tow-bar being designed to be connected to a secondary part of said two parts.

20. The connecting and transmission device according to claim 19, wherein the third axis intersects the second axis.

21. The connecting and transmission device according to claim 19, wherein at least said second connection is a pivot-type connection.

22. The connecting and transmission device according to claim 19, wherein said secondary part comprises a barrel centered on the second axis and guided in rotation in a hub of said primary part, said primary tow-bar being designed to be connected to said hub by said first connection and said second connection.

23. The connecting and transmission device according to claim 22, wherein said hub is guided on said barrel by means of two bearings spaced apart from one another.

24. The connecting and transmission device according to claim 23, wherein said two bearings consist of roller bearings.

25. The connecting and transmission device according to claim 23, wherein said first connection and said second connection extend approximately halfway between the two bearings.

26. The connecting and transmission device according to claim 19, wherein said first connection and said second connection each comprise a pivot pin provided on said primary part and designed to cooperate with a corresponding sleeve provided on said primary tow-bar.

27. The connecting and transmission device according to claim 26, wherein said primary part comprises a housing and/or a hub which is formed by casting, and said pivot pins are also formed by casting.

* * * * *